Figure 1:
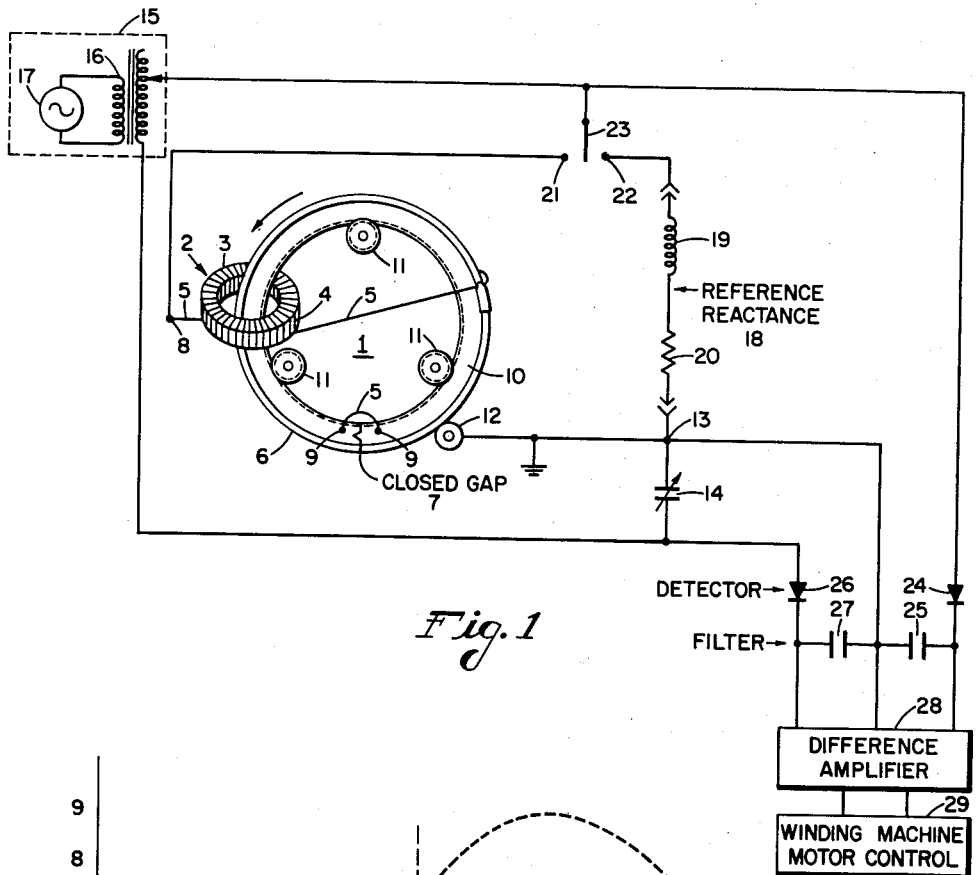

May 4, 1965 P. H. WARBURTON ETAL 3,181,803
TOROIDAL CORE WINDING MACHINE
Filed Feb. 14, 1962

INVENTORS.
PETER H. WARBURTON
BY BENJAMIN F. WHITE

AGENT

United States Patent Office 3,181,803
Patented May 4, 1965

3,181,803
TOROIDAL CORE WINDING MACHINE
Peter H. Warburton, East Rochester, and Benjamin F. White, Rochester, N.Y., assignors to General Dynamics Corporation, Rochester, N.Y., a corporation of Delaware
Filed Feb. 14, 1962, Ser. No. 173,280
3 Claims. (Cl. 242—4)

The present invention relates generally to an electronic measuring system, and more particularly, to an automatic electronic measuring system for automatically controlling a winding machine.

Although the present invention is suited for more general applications, it is particularly adapted for winding machines employed for winding ring-type coils having a magnetizable core, such as toroidal inductors. Winding machines of this type usually include an annular wire carrying rotatable shuttle interlinking the core and means for rotating the shuttle in a plane substantially normal to the plane of the ring core. The shuttle is arranged to interlink the ring core and to superimpose the wire thereon to form the coil on the core.

It is the present practice in the manufacture of toroidal inductors, having inductance values within very close specified limits, to wind on the core a series of coils with a precalculated number of turns of wire appropriate to the permeability of the core. After the winding of each coil, the inductance of the coil is adjusted by removing turns of wire from the coil. This adjustment is necessary in some instances because a plurality of coils each having the same precalculated number of turns do not always result in the same given value of inductance because of differences in the distributed capacitance and the permeability of the cores. The different permeability of the cores may be due to irregularities in the core, such as voids, fissures and grain size.

Attempts have been made to adapt electrical indicating circuits to winding machines to indicate when a specified inductance value has been achieved rather than employing means for counting the turns on the coil. Indicating circuits of this type include a cathode-ray oscilloscope connected through horizontal and vertical amplifiers, respectively, to a resistance R, capacitance C, inductance L circuit and a voltage generating source. The inductance in the RCL circuit is that of the coil which is being wound, whereas the capacitance consists of a known value which will cause a resonant condition when the coil has been sufficiently wound to produce the specified inductance. Electrical indicating devices of this type depend on the coil having a high Q, figure of merit, and a sharply tuned RCL resonant circuit for their operation. For this reason, there is provided a transverse joint or gap in the shuttle periphery equipped with an insulator extending across the joint or gap so that the shuttle will not appear as a short-circuited turn linking the core. In operation, when the RCL circuit is in resonance, the potentials from the generator and across the RCL circuit are in phase, the trace on the oscilloscope becomes a straight line and under other conditions it opens into an ellipse or circle.

While the prior art indicating circuits have worked satisfactorily for the purpose for which they were intended, these indicating circuits cannot be advantageously adapted in an automatic winding machine, which machine is required to produce coils having precise inductance values. No known attempts have been made to reduce the effect of the opening and closing gap in the shuttle. The effect of an opening and closing shuttle is comparable to an opening and closing shorted turn which does not manifest itself until a near-resonant condition is obtained in an RCL circuit. At the near-resonant condition, substantial voltage transients at or about this resonant condition will trigger a detection device before the necessary resonant condition occurs. An operator must still terminate the winding of a coil when the trace in the oscilloscope is a straight line. It is difficult to terminate the winding of the coil precisely when a predetermined inductance value is achieved because the oscilloscope trace is affected during each revolution of the shuttle, since the open insulated joint or gap removes the generator potential from the RCL circuit resulting in an open circuit.

Accordingly, it is the principal object of the present invention to provide an electronic control system for a winding machine which terminates the winding of a coil automatically when a precise predetermined inductance value is achieved.

It is another object of the present invention to provide an automatic electronic control system for a toroidal winding machine which eliminates the necessity of further adjustment of the inductance of the coil wound thereon notwithstanding variations in the permeability of the core.

It is still another object of the present invention to provide an automatic electronic control system for a winding machine which continuously supervises the winding of a coil and for automatically stopping the winding operation if a wire breakage occurs.

It is another object of the present invention to provide an automatic electronic control system adapted for a toroidal winding machine utilizing an RCL resonant series circuit which depends upon a low Q RCL resonant series circuit rather than a high Q RCL series resonant circuit.

It is yet another object of the present invention to provide an automatic electronic measuring system for machines employed in the manufacture of capacitances and inductances.

Another object of this invention is the provision of a novel electronic control system for a coil winding machine for winding coils having like inductance values in the order of 0.5% of the inductance value or ± one turn on the coil.

Still another object of the present invention is the provision of a useful, simple and inexpensive machine control system.

The above and other objects of the present invention are achieved in an electronic control system wherein a source of constant frequency potential continuously supplies an RCL series circuit having a given capacitance and an adjustable inductance. The adjustable inductance in a preferred embodiment of the invention includes the coil which is being wound, an electrical conducting rotatable shuttle, and the wire thereon. The shuttle includes a mechanically and electrically closed gap or joint which permits a cointinuous flow of current through the coil, shuttle and wire thereon, the inductance of the coil being variable during winding operation. The control system further includes first means for deriving a first direct current voltage having a magnitude proportional to the amplitude of the constant frequency potential difference across the given capacitance and second means for deriving a second direct current voltage having a magnitude proportional to the amplitude of the constant frequency potential difference across the coil, shuttle and wire thereon. Means are provided for comparing the relative magnitude of the first and second direct current voltages and control means to stop the rotating of the shuttle to thereby terminate the varying of the inductance when the first direct current voltage bears a predetermined ratio with respect to the second direct current voltage.

The invention will be better understood as the following description proceeds, taken in conjunction with the accompanying drawing which comprises two figures on a single sheet.

Figure 2:
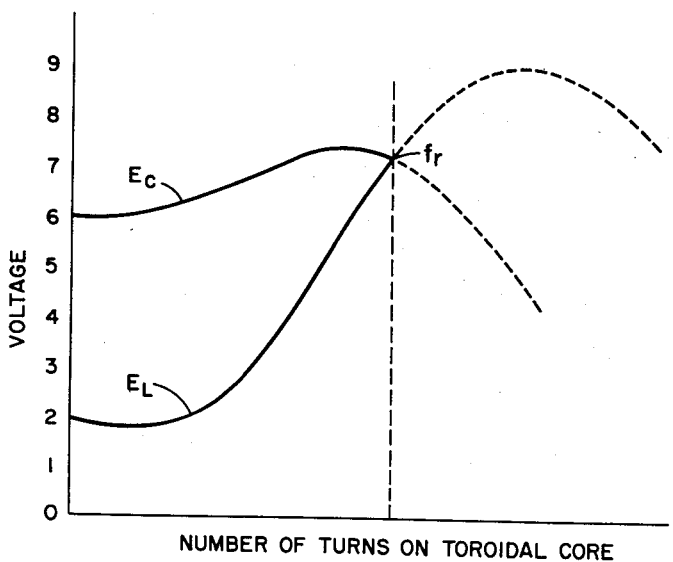

FIG. 1 illustrates a diagrammatic representation of the winding machine, in part, embodying the invention; and FIG. 2 graphically illustrates in solid lines the characteristic curve of point-by-point sampling of the direct current voltage $E_C$, derived from the current I times the impedance $Z_C$, across the capacitor and the direct current voltage $E_L$, derived from the current I times the impedance $Z_L$, across the coil, shuttle and wire thereon during the winding of the coil, while the dotted portion of the curves illustrates what would have happened to the direct current voltages $E_C$ and $E_L$ if the winding of the coil continued beyond the point $f_r$.

Referring now to FIG. 1, there is shown a generalized toroidal winding machine of the type adapted for use in connection with the subject invention. This machine comprises a winding section 1 modified in accordance with the requirements of this invention. Many of the well known details of the winding machine have been omitted in order to preserve simplicity in the drawing. The winding section 1 is provided with a clamp, not shown, for supporting a toroidal inductor, such as 2. The toroidal inductor 2, illustrated in perspective view, comprises a ring core 3 on which a coil 4 is wound from a strand of wire 5. The winding section 1 includes an annular wire carrying electrically conducting shuttle 6 having a normally closed transverse joint thereon, generally designated at 7, closed as in normal operation. The shuttle 6 interlinking the core 3 as in normal operation, carries a predetermined length of wire 5, one end of which is bared of insulation and is connected to a terminal 8. The other end of the wire 5, bared of insulation, is connected across joint 7 in accordance with this invention. For this purpose, holes 9 are provided on rim 10 of the shuttle 6. The wire 5 electrically and mechanically closes the joint 7. The wire 5 is first wound upon the shuttle 6 in a clockwise direction and, accordingly, is therefore unwound from the shuttle 6 onto the core 3 in a counterclockwise direction.

The predetermined length of wire 5 carried by the shuttle 6 is slightly greater than that normally required to wind a complete coil 4 and sufficient to provide the required inductance on a core of the minimum permeability likely to be encountered in practice.

The winding section 1 further includes drive means having friction drive rollers 11 which rotate the shuttle 6 in a plane substantially normal to the plane of the ring core 3. The drive means is coupled to a winding machine motor control 29. The winding machine motor control 29 in response to a signal from the electronic control system terminates the winding of the coil 4 when it has attained a predetermined inductance, thus preventing the addition of unwanted turns of wire 5 on the coil 4, which would, of course increase the inductance of the coil 4. The winding machine motor control will be discussed more in detail as the specification proceeds.

At 12 there is represented a grounding contact roller arranged in rotatable and continuous electrical contact engagement with the shuttle 6, the coil 4 and the wire 5 thereon. The grounding contact roller 12 connects in series the coil 4 and an adjustable capacitor 14 through a terminal 13. Guiding may be enhanced through the plating of all rotating parts in the winding section 1, with a low resistance material such as rhodium. Slip rings and brushes, not shown, may be affixed to one of the rollers and electrically connected to the winding machine frame, not shown, which it itself at ground potential. Transients are thereby reduced.

Associated with the series connected coil 4 and the adjustable capacitor 14 is a source of constant frequency potential 15 represented as an output transformer 16 excited by a constant single frequency voltage supply 17 which may be an oscillator circuit of conventional design and, as such, need not be described herein.

Connected in parallel to coil 4 at terminal 13 is a reference reactance 18 comprising a standard coil 19 of a given inductance value and a resistor 20. The reference reactance 18 is used only in calibrating the electronic control system. The coil 4 and the reference reactance 18 are connected to contacts 21 and 22, respective of a switch, such as a single pole double throw switch 23, for selectively connecting the source of constant frequency potential 15 to the series connected adjustable capacitor 14 and the reference reactance 18, or the series connected adjustable capacitor 14 and the coil 4, the shuttle 6 and the wire 5 thereon.

In accordance with the invention, the electronic control system includes a differential reactance detector circuit comprising a first means for deriving a first direct current voltage $E_C$ having a magnitude proportional to the amplitude of the constant frequency potential difference across the adjustable capacitor 14. The first means includes a detector 26 and a filtering capacitor 27. Also included is a second means connected to switch 23 and ground terminal 13 for deriving a second direct current voltage $E_L$ having a magnitude proportional to the amplitude of the constant frequency potential difference across the coil 4, shuttle 6 and the wire 5 thereon which are connected to the switch 23 and terminal 13. The second means includes a detector 24 and a filtering capacitor 25.

The differential reactance detector circuit further includes a difference amplifier 28 having as inputs thereto the first and second direct current voltages, and an output connected to the winding machine motor control 29. By way of example, and not by limitation, a well known difference amplifier is an amplifier having two inputs and whose output is a function of their difference. A difference amplifier 28 may include two triodes, one of which has its grid connected to the first means for deriving a first direct current voltage and the other triode having its grid connected to the second means for deriving a second direct current voltage and means coupled to the two triodes for deriving a voltage output from one of the triodes only when the first direct current voltage is equal to or positive with respect to the second direct current voltage, the output voltage being effective to operate a relay, not shown, in the winding machine motor control 29.

In calibrating the electronic control system and the winding machine section 1 for its running operation, the inductive reactance 18 is switched into series with the adjustable capacitor 14. The capacitance of the capacitor 14 is increased to tune the series circuit to resonance. At this setting, the direct current voltages $E_L$ and $E_C$ are equal, as shown at point $f_r$ in FIG. 2. The electronic control system is now calibrated for producing coils 5 having like inductance values and each corresponding to the inductance of the reference reactance 18.

In preparing the toroidal winding machine for its running operation, the stand of wire 5 is first connected to and wound on the shuttle 6, as was aforementioned. One end of the wire 5 is connected to terminal 8 and the other end is connected to the shuttle 6. The switch 23 closes the series circuit including the adjustable capacitor 14, the coil 4, the shuttle 6, the wire 5 thereon and the source of constant frequency 15.

The operation of the electronic control system will be explained in a nonrigorous fashion by considering the relationship of the coil 4, from start to finish, to the potential difference $IZ_C$ across the capacitor 14 and the potential difference $IZ_L$ across the coil 4, shuttle 6 and wire 5 thereon. In accordance with the invention, the potential difference $IZ_C$ is rectified and filtered by detector 26 and filtering capacitor 27 to derive a first direct current $E_C$, and the potential difference $IZ_L$ is rectified and filtered by detector 24 and filtering capacitor 25 to derive a second direct current voltage $E_L$. Referring to FIG. 2, it will be seen that at the start of winding the first direct current voltage $E_C$ is considerably more positive with respect to the second direct current voltage $E_L$. As a few turns of wire 5 are added to the core 3, the direct current voltage $E_L$ level drops slightly due to the bucking effect between the turn of wire 5 on the core 3 and the turns of wire on the shuttle 6. With the addition of still more turns of wire 5 on the core 3, the direct current voltage $E_L$ increases more rapidly while the direct current voltage $E_C$ begins to level off. Just before the coil 4 is completed, the direct current voltage $E_C$ level begins to drop while the direct current voltage $E_L$ still increases. Now, when there are enough turns of wire 5 placed on the core 3 to give an inductance value equal to that of the reference reactance 18, the series circuit will be in resonance as shown at the cross-over point $f_r$ since the capacitive reactance was made to equal the capacitive reactance when the electronic control system was calibrated. The direct current voltages $E_C$ and $E_L$ are then fed into the difference amplifier as first and second inputs, respectively. In response to the first and second inputs being equal, the difference amplifier sends an output signal to the winding machine motor control which terminates the winding of the coil 4.

The curves of the first and second direct current voltages $E_C$ and $E_L$, respectively, have been extended in dotted lines to illustrate what would happen if more turns of wire 5 were placed on the coil 4. Beyond the point $f_r$, the direct current voltage becomes positive-going with respect to the direct current voltage $E_C$. The difference amplifier 28 may be made to have an output when the direct current voltage $E_C$ bears a predetermined ratio with respect to the direct current voltage $E_L$.

In operation of the electronic control system, it will now be apparent that just before the series circuit is in resonance the impedance due to the capacitance will attain a maximum value and that after the series circuit has passed its resonant condition the impedance due to inductance and resistance will attain a maximum value. When the series circuit is in resonance, the point of cross-over $f_r$, the impedance due to the capacitance will equal the impedance due to inductance and resistance. Thus, it can be seen that a measured $IZ_L$ voltage drop at this cross-over point $f_r$ will, if the inductance is increasing in value as it would be if the coil were being wound, show an increasing voltage and conversely the voltage drop across the capacitance $IZ_C$ will show a decreasing voltage.

Referring again to FIG. 1, the operation of the electronic control system terminates the winding operation of the coil 4 by applying an output voltage to the winding machine motor control 29 in response to the first direct current voltage bearing a direct ratio with respect to the second direct current voltage. Since some drive means have a tendency to over-run the terminating position of shuttle 6 when coil 4 has attained its required inductance, a second difference amplifier, not shown, may be included in the electronic control system to decrease the speed of the drive means just before the final inductance value of the coil 4 has been achieved.

While there has been shown a single embodiment of the invention, it should be obvious that other arrangements could be provided. For example, the inductance in the series circuit could be fixed while the capacitance in the series circuit could be varying, such as in the manufacture of wound capacitors. The electronic control system could then be used to terminate the winding of the capacitor when a predetermined capacitance is achieved. Therefore, the appended claims are drawn to cover not only specific details shown in the drawing but also to cover other modifications which may fall within the true spirit of the invention.

What is claimed is:

1. A toroidal coil winding machine comprising a rotatable ring-shaped electrically conducting split shuttle having means for carrying a given number of turns of insulated wire thereon, a toroidal core interlinking said shuttle and arranged to have said insulated wire wound thereon to form a toroidal coil in response to rotation of said shuttle, means for electrically short-circuiting the split in said shuttle at all times while it is rotating, drive means coupled to said shuttle for rotating said shuttle, a source of constant frequency alternating voltage, a capacitance having a particular value, means for connecting in a series circuit said source, said capacitance and said insulated wire, whereby said circuit has an inductance which is a single-valued function of the number of turns of said insulated wire wound on said core and whereby said shuttle forms a single shorted turn which is magnetically coupled to said coil and reflects an appreciable resistance effectively in series with said coil in said circuit which reflected resistance is a single-valued function of the number of turns of said insulated wire wound on said core, first signal means for continuously deriving as said shuttle rotates a first signal proportional in magnitude to the peak amplitude of the potential difference across said insulated wire, second signal means for continuously deriving as said shuttle rotates a second signal proportional in magnitude to the peak amplitude of the potential difference across said capacitance, and means coupled to said first and second signal means for disabling said drive means to prevent further rotation of said shuttle in response to the difference in magnitudes of said first and second signals achieving a predetermined value.

2. The machine defined in claim 1, wherein said predetermined value of the difference in magnitudes of said first and second signals is zero.

3. The machine defined in claim 1, wherein said capacitance is a variable capacitance, and further including a reference inductance having a valve equal to the inductance to which said coil is to be wound and a reference resistance having a value equal to the value of the resistance reflected in said series circuit by said shuttle when said coil has the inductance to which it is to be wound, and switch means for substituting said reference inductance and reference resistance in series with each other for said insulated wire in said series circuit, whereby said variable capacitance has said particular value thereof when it is adjusted with said reference inductance and reference resistance substituted in said series circuit by said switch to that value at which said difference in magnitudes of said first and second signals have said predetermined value.

References Cited by the Examiner

UNITED STATES PATENTS

| | | | |
|---|---|---|---|
| 2,046,704 | 7/36 | Slonczewski | 324—59 |
| 2,593,175 | 4/52 | Packard et al. | 324—57 |
| 2,697,559 | 12/54 | Scarce et al. | 242—5 |
| 2,759,146 | 8/56 | Heinz | 324—57 |
| 2,863,609 | 12/58 | Link | 242—4 |
| 2,902,645 | 9/59 | Wallenfang | 324—59 |

OTHER REFERENCES

"Measuring Coil Characteristics Without an Impedance Bridge," Article in Electronics, May 1943, pp. 86–88, 176 and 178.

"Inductance and Dynamic Resistance Meter," Article in Wireless World, August 1954, pp. 377–381.

MERVIN STEIN, *Primary Examiner.*

HARRISON R. MOSELEY, *Examiner.*